United States Patent [19]

Chrzanowski

[11] 4,322,730
[45] Mar. 30, 1982

[54] CONTROLLED DELAY GATE STEALER

[75] Inventor: Edward J. Chrzanowski, Linthicum, Md.

[73] Assignee: The United States of America as represented by the Secretary of the Navy, Washington, D.C.

[21] Appl. No.: 36,457

[22] Filed: Jun. 15, 1960

[51] Int. Cl.³ .............................................. G01S 7/38
[52] U.S. Cl. .................................................. 343/18 E
[58] Field of Search ................ 343/18, 18 E; 325/132

Primary Examiner—Malcolm F. Hubler

EXEMPLARY CLAIM

1. A controlled delay gate stealer for radar ranging counter-measures comprising: an own radar ranging receiver; an own radar repeater transmitter and repeater receiver, said radar repeater receiver being capable of receiving signals from distant radar and of causing said repeater transmitter to transmit same over said repeater transmitter as falsified radar echo signals; a delay circuit coupled between said radar repeater transmitter, and said radar repeater, a range control circuit coupled between said radar ranging receiver and said delay circuit, and connected to the coupling between said delay circuit and said repeater receiver, said radar ranging receiver adapted to receive echoes from said falsified radar echo signals for comparison in said range control circuit with said falsified range signals to produce a compared signal to effect a delay in said delay circuit for delaying said falsified echo signals transmitted by said radar repeater transmitter whereby falsified echo signals are transmitted back to the distant radar within the range tracking capabilities of the distant radar and are used for active radar range tracking of said distant radar position.

9 Claims, 3 Drawing Figures

CONTROLLED DELAY GATE STEALER

This invention relates to electronic countermeasures and more particularly to radar countermeasures utilizing range gate stealers of a type to control the delay gate to always remain within the range tracking capabilities of a remote radar that is attempting to obtain true range measurement of own radar position.

The conventional range gate stealer is a pulse-repeating countermeasure which is designed to deceive the range track servo of a remote or enemy tracking radar. This device receives the radar pulse, amplifies it, and retransmits it at the same frequency at higher power. This yields a higher amplitude false target at the same position as the real target, the limitation of the equipment being that it causes a finite time delay to exist between the received and the retransmitted pulse. Current operational techniques have reduced this delay to 0.1 microsecond. A constantly increasing time delay is programmed into the pulse before retransmission in order to simulate a target much larger than the actual target moving out of the position of the real target. Since such a programmed delay always represents a decreasing range rate, care must be exercised that this deceleration does not exceed the acceleration capabilities of the hostile range track servo. If too large a deceleration is used, the tracking loop will not follow the false target and will return to the real target, so that deception is foiled. If, on the other hand, the amount of deceleration is within the capabilities of the track servo, the range track loop will follow the false target yielding erroneous range and range rate information to the enemy radar. When it is suspected that the range tracking gate is sufficiently distant from the true target range position, the false target is removed causing the range track system to unlock. It is hoped that by the time the attacker is able to reacquire the true target, his position is such that he cannot continue on his original attack course, and, for high speed aircraft, this is very possible.

In the discussion above, only a decelerating false target is considered. In order to simulate an accelerating false target, it is necessary to "retransmit" a pulse before it actually arrives. With a stable pulse repetition rate tracking radar, this may be possible; however, it cannot be expected that the enemy will be so co-operative, and only delaying type repeaters will be considered.

From the discussion above it should be evident that there are several problems associated with the use of conventional range gate stealers. The most important of these is the selection of the type of time delay program which should be inserted onto the repeated pulse without exceeding the capabilities of the radar tracking system. It can be shown that a delay program can be made to represent any particular amount of deceleration. As a matter of fact, if there is a constant closing velocity between the two aircraft, a delay can be programmed to present to a tracking radar a false target which is decelerating to zero closing velocity although the true target maintains a constant closing velocity. If, on the other hand, there is a relative acceleration between the two aircraft, a delay can be programmed into a repeater aboard one of the aircraft to simulate a false target which maintains a constant relative closing velocity. If the latter situation is true, then the range track servo of the tracking system will readily follow the false target, since most servos used for this application are second order systems which are at equilibrium (zero error) when tracking constant velocity targets.

The controlled delay gate stealer has the capability of generating a false target which decelerates at a rate different from the true target and yet is within the limits of the hostile tracking servo. In the case of accelerating true targets, the deceleration is such to present a false target which maintains constant velocity with respect to the tracker. As long as the range track servo is following the accelerating target, the second order system will maintain an error within its loop; this error is proportional to the amount of acceleration. The false target decelerating to a constant closing velocity will appear as a more desirable target to the tracking system since the loop is tending to zero error. The tracking system is thus forced to follow a false target of constant velocity which is assuredly within the capabilities of all second order systems.

In the case of attack courses where deceleration only are experienced (as is true over the complete path of pure pursuit courses), the "stealer" has the capability of measuring the amount of deceleration which a hostile tracking radar can tolerate, and with this information, it generates false targets which are decelerating at a rate different from the actual target rate but never exceeding the capabilities of the hostile tracking loop. In a pure pursuit course it can be shown that the amount of deceleration varies over the complete path, decreasing continuously as the attacker approaches from abeam. The "stealer" measures the greatest amount of deceleration that was attained in the attack, and subsequently restrains the deceleration to a value less than that measured. Because the attacker has experienced the same target deceleration it can be assumed that his tracking radar was able to withstand the deceleration attained. As the attacker continues his course, a false target is generated whose degree of deceleration is decreasing at a slower rate than that of the true target, and the tracker is drawn off the true target. In some cases it may prove more effective to maintain the deceleration of the false target at a constant level while the amount of deceleration of the true target is decreasing.

If the situation arises that no such acceleration or deceleration is occurring and use of the "stealer" is desired, a simple maneuver of own aircraft can cause the condition required (this may be simply a deceleration or acceleration of own aircraft). If such maneuvers are objectionable, the controlled delay gate stealer can still be used as a conventional gate stealer except that the deceleration imposed on the false target may or may not be within the capabilities of the hostile range tracker. This latter situation is always true with conventional "stealers".

Because the design of own tracking system will be known, the amount and polarity of error can be calibrated to yield the true value of acceleration or deceleration. This, in turn determines the time delay program to be imposed onto the repeated pulse. In the case of an accelerating target, the delay is such to present a false target decelerating to constant velocity. In the case of a decelerating target, the delay is such to present a false target decelerating at a value different from that of the true target.

The objection to using a ranging radar, besides the added complexity, is that it may betray to the attacker that such information is being acquired. The controlled delay gate stealer takes advantage of the power generated by the radar pulse repeater to remove this possibility. The energy transmitted by the repeater for presenting false targets is made sufficiently great to allow a reflection from the attacker which can be detected by a ranging receiver aboard own aircraft. The repeater, then, serves as the active radar, and because only range information is required, no other complication is needed. A tracking radar pulse reaching the repeater is delayed (according to the appropriate program), amplified, and retransmitted and the transmitted pulse sets zero time for own radar range tracking loop. The echo due to the repeater pulse is detected in the ranging receiver and the true range to the attacker measured. With this scheme, the true range, as well as range rate and range acceleration, is continuously measured by own ranging system regardless of the setting or program of the delay. Thus, the range and closing velocity measured by the hostile tracking system is erroneous, as determined by the programmed delay; true measurements of these parameters are always made by own ranging system. The ranging system will measure the amount of acceleration or deceleration and properly program a delay into the repeater so that the repeated false target is one of constant closing velocity or constant deceleration depending on the situation. Assume, for example, an attacker closing at a constant rate; the hostile tracking servo as well as own will maintain zero error until an acceleration begins to take place; this acceleration will present an error in own tracking system which will begin to program a delay into the repeater which will present a target maintaining the constant relative velocity demanded by the hostile tracking system; and this then will make the false target the more desirable target for the attacker's range track system, and deception is accomplished.

It is therefore a general object of this invention to provide a radar range countermeasure of programming a delay to repeat transmission of ranging pulses from enemy radar of increased signal strength that never exceed the tracking capabilities of the enemy radar. It is also an object of this invention to provide a controlled radar delay gate stealer in radar range countermeasures that utilizes the falsified echo signals for active radar ranging of own radar for controlling the delay program not to exceed enemy radar ranging capabilities.

These and other objects and the attendant advantages and uses will become more apparent to those skilled in the art as the description proceeds with reference to the accompanying drawing in which.

Figure 1:
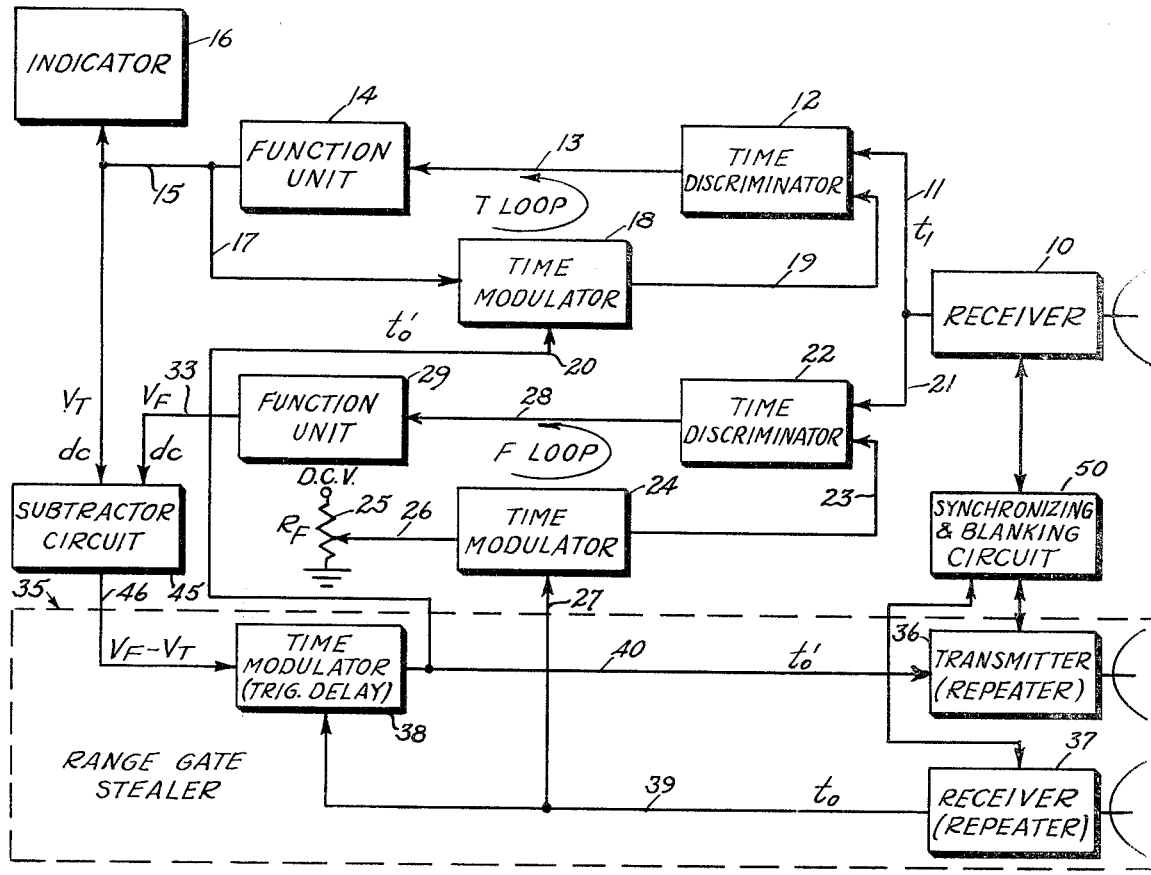
FIG. 1 is a block circuit functional diagram of the invention combination.

Referring more particularly to FIG. 1 there is shown a radar receiver 10 having a conductor means 11 conducting received radar intelligence to a time discriminator 12 the output of which discriminator is by way of conductor means 13 to a function unit 14 to produce a voltage on the output lead 15 to an indicator 16 representative of the range of a target object. The function unit 14 performs the operation of converting the time discriminator output into a form suitable for controlling the local time modulator and may be an amplifier, electrical integrator, rate servo, or a complex combination of such elements. The output of the function unit 14 is also conducted by the conductor means 17 to a time modulator 18 and the output of the time modulator 18 is conducted via conductor means 19 as the second input to the time discriminator 12. The time discriminator 12, function unit 14, and the time modulator 18 together with their conductor means 13, 17, and 19, constitute a range tracking loop of a target object received by the radar receiver 10 to produce range detection on the indicator 16 by the computed analog relationship of volts per thousand yards or other suitable relationship. This tracking loop is well-known to those skilled in the art as shown and described in the Radiation Laboratory Series, First Edition, Volume 20 on "Electrical Time Measurements" page 276. The receiver 10 and the above-mentioned loop together with the indicator means is a radar receiver system of the conventional and well-known type to provide indicated range information of a target object. The time modulator is initiated in its operation of producing sweep slope voltage by a triggering pulse applied thereto by way of the conductor means 20 as is well understood by those skilled in the radar receiver range tracking loop art. The development of the triggering pulse coming via the conductor means 20 will become clear as the description proceeds. The radar receiver 10 receives echo pulses from transmitted pulses developed as falsified echo pulses from pulses received by a radar receiver 37 which will also be explained as the description proceeds.

The radar receiver 10 also applies the received intelligence by way of conductor means 21 to a time discriminator 22 in a false tracking loop. The second input of the time discriminator 22 comes by way of conductor means 23 from a time modulator 24 which time modulator is voltage biased from a variable voltage source, as a potentiometer 25, conducted to the time modulator 24 by way of the conductor means 26. The conductor means 26 is connected to the movable tap of the potentiometer 25 which potentiometer may be connected between a direct current voltage source and a fixed potential such as ground. The time modulator 24 is initiated in its development of sweep slope voltage, as is well understood in the art, by triggering pulses applied by way of the input conductor means 27. The development of the triggering pulses applied by way of conductor means 27 will become clear as the description proceeds. The output of the time discriminator 22 is by way of a conductor means 28 to a function unit 29 of the false tracking loop, or F-loop. The output of the function unit 29 is by way of conductor means 33 which may be applied to an indicator unit, if desired.

In order to produce countermeasures against enemy radar ranging, an own radar range gate stealer 35 is coupled in combination with the active radar 10 to 20 and the false tracking loop described above. The range gate stealer consists of a radar transmitter repeater 36, a radar receiver repeater 37, and a time modulator trigger delay circuit 38. The radar receiver repeater 37 applies received radar signals from remote radar ranging trackers by way of conductor means 39 to the time modulator trigger delay 38 to trigger this time modulator in the production of developed sweep slope voltages to produce delayed trigger pulses on the output conductor 40 used to trigger the transmitter repeater 36 to cause radar pulses to be transmitted by the transmitter repeater 36. The received radar intelligence signals conducted by way of output conductor means 39 are also applied by way of conductor means 27 to the time modulator 24 in the false tracking loop and the trigger delayed output pulses conducted by way of the conductor means 40 are also conducted by way of conductor means 20 to the time modulator 18 in the true range tracking loop, hereinafter referred to as the T-loop. The output of the true range tracking loop, or T-loop, develops on the output conductor 15 a voltage representing the true range from the target echo signal received by the receiver 10 which true range voltage will be hereinafter referred to as $V_T$. Likewise the output voltage on the conductor means 33 from the function unit 29 of the false tracking loop, or F-loop, is represented by $V_F$. $V_T$ and $V_F$ are applied to a subtractor circuit 45 which will cause the voltage $V_T$ to subtract from the voltage $V_F$ to produce the voltage $V_F - V_T$ on the output conductor 46. The voltage on the output conductor 46 of the subtractor circuit 45 is applied as a voltage bias to the time modulator trigger delay circuit 38 to cause a delay in accordance with this $V_F - V_T$ voltage to the trigger pulse coming by way of the conductor means 39 from the receiver repeater 37. In order to get proper co-ordination between the transmitter receiver 36, the receiver 10, and receiver repeater 37 in the proper sequence, these receivers and transmitter are coupled to a synchronizing and blanking circuit 50 to cause the receivers to be turned on alternately in the proper sequence to avoid any intervals of reception of enemy radar signals in the active radar. The synchronizing and blanking circuit 50 may be of any type to gate, switch, or blank receivers on and off in synchronism with a transmitter sequence in a manner disclosed in U.S. Pat. No. 2,569,485 of M. A. McLennan, the number of receivers being a matter of choice although it is desirable to gate or blank two receivers in an alternately synchronous manner herein. The synchronizing and blanking circuit 50 may be a bistable multivibrator circuit triggered by the transmitter repeater 36 and the receivers 10 and 37 coupled from opposite anode outputs to alternately blank or gate operation thereof; or the block 50 may take the form of time discriminators as disclosed in the above-mentioned text Radiation Laboratories Series, Volume 20, Section 8.11 on "Time Discriminators". The active radar therefore consists of the transmitter repeater 36 and the receiver 10 with its related true range tracking loop 12 to 19. As may now be readily understood, the range gate stealer 35 also includes the transmitter repeater 36. The receiver repeater 37 is automatically turned on or made active to receive pulses transmitted from enemy or distant object radar which received pulses are conducted by the conductor means 39 to trigger the time modulators 24 and 38 for developing the respective output pulses. Each output pulse from the time modulator trigger delay circuit 38 over the conductor means 40 is applied to the transmitter repeater 36 to produce a pulse directed back toward the enemy or target object radar with a controlled delay therein for each received pulse as will hereinafter be made clear in the statement of operation. The pulse repetition frequency is thus maintained for continuously received pulses. This pulse transmitted by the transmitted repeater 36 is a falsified echo signal for the enemy or target object radar system which should give the enemy radar a falsified range of own radar position. At the same time the falsified echo signal transmitted by the transmitter repeater 36 is reflected back from the enemy radar or target object position and received in radar receiver 10 forming the receiver of the active radar system of own radar. The use of the transmitter repeater 36 for producing the falsified echo signals for the enemy radar system as well as the radar signals for the active radar system of own radar eliminates the possibility of the enemy radar being put on notice that the enemy radar or target object is likewise being tracked, as would be possible if a separate radar transmitter were used in the active radar system of own radar.

The time modulators and time discriminators used in this invention are of conventional construction of the type found in Volume 20 of the Radiation Laboratory Series, "Electronic Time Measurements", Chapter III.

The information $V_T$ developed by the active radar system and the information $V_F$ produced in the false tracking loop, or F-loop, automatically provide for a program of delay for producing falsified echo signals always within the capabilities of range tracking in the enemy or target object radar system. This program is initially established by the adjustment of the potentiometer 25 to produce a bias in the time modulator 24. This will produce in the F-loop a false range voltage $V_F$ that is time discriminated in the time discriminator 22 with a received echo signal coming by way of the conductor means 21. The output of the time discriminator 22 will vary in accordance with the time discrimination between the fixed pulses produced in the time modulator 24 in accordance with the potentiometer 25 setting and the echo pulses received by the receiver 10. The output voltage of $V_F$, representing the false range from the F-loop, is therefore variable in accordance with the echo signals received by the receiver 10. The time modulator trigger delay 38 will therefore be controlled automatically in accordance with the voltage difference between $V_T$ and $V_F$ which voltages $V_T$ and $V_F$ are both variable in accordance with the acceleration, deceleration, or constant velocity existent between own radar and the enemy radar or target object radar system. If the potentiometer 25 is never adjusted to produce falsified echo signals from the transmitter repeater 36 outside the tracking capabilities of the enemy radar or target object radar system, the automatically controlled timing delay in the trigger delay circuit 38 by the difference in voltage $V_F$ and $V_T$ will never cause transmitter 36 to produce falsified echo signals outside the capabilities of the enemy radar or target object radar system. To provide a better understanding of the automatic time delay and the controlled range gate stealer system, a couple of examples of operation will be given hereinbelow.

OPERATION

In the operation of the controlled range gate stealer, let it be understood that the pulses transmitted and received are identified by time reference characters, such as the ranging pulses received from the enemy radar being identified by $t_o$, the delayed pulses retransmitted as falsified echo signals identified as $t_o'$ and the echo pulses received as an echo from the $t_o'$ pulses as $t_1$ pulses. In the description of operation of the control range gate stealer reference is also made to FIGS. 2 and 3.

Figure 2:
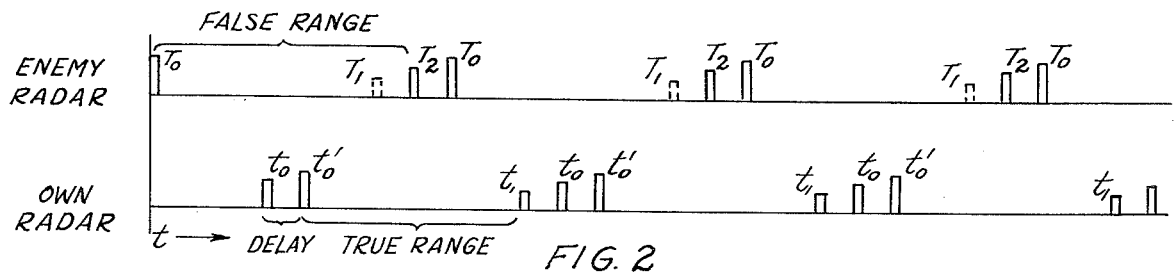
FIG. 2 is a voltage-time graph of the transmitted and received radar pulses co-ordinated in time sequence where own and enemy radars are at constant range.

In the first example describing the operation of the controlled range gate stealer let it be assumed that own radar and the enemy radar or target object radar system are stable or movable at constant range. Referring more particularly to FIG. 2 in this example the upper voltage-time graph indicates what is transmitted and received by the enemy radar and the lower voltage-time graph illustrates what is transmitted and received by own radar. The time factors for the enemy radar will be given with a capital T while the time factors of own radar will be given by small case t. Let it be assumed that at time $T_o$ the enemy radar transmits a ranging pulse, illustrated as $T_o$ in the upper voltage-time graph of FIG. 2. This transmitted pulse will be received by the receiver repeater 37 of own radar as a pulse $t_o$, illustrated in the lower voltage-time graph of FIG. 2. This $t_o$ pulse is time delayed in the time modulator trigger delay circuitry 38 to trigger the transmitter repeater 36 to produce a falsified echo signal $t_o'$ of higher power than the received signal $t_o$. The enemy radar will receive an echo pulse $T_1$ which would be the true range of own radar from the enemy radar but, since the falsified echo pulse $t_o'$ is of higher intensity, the enemy tracking system and the falsified echo signal received by the enemy radar is $T_2$. In the same sequence own radar will receive in the receiver 10 the echo $t_1$ of the falsified transmitted target echo $t_o'$ which provides the true range of the enemy radar station in own true tracking loop, or T-loop. It is from these true range signals of own active radar ranging system, indicated by the indicator 16 which may be an oscilloscope or the like calibrated in range to yield information for the operation of the control range gate stealer, that appropriate adjustments in the potentiometer 25 may be made which will always produce falsified echo signals within the capabilities of the enemy tracking radar system. As shown by FIG. 2 in this example of constant range between the two radar system positions, the true range is maintained constant and likewise the falsified range $T_2$ to the enemy radar will always be different from the true range whereby enemy at the enemy radar station will not be able to effectively fire on own radar position to acquire hit. As illustrated in FIG. 2, the enemy radar station receives information that own radar is much farther distant than the actual range. If the potentiometer 25 were adjusted to be outside the capabilities of the enemy radar tracking system, the enemy tracking radar receiver would lose the falsified echo signal $T_2$ and begin tracking the true range tracking signal $T_1$ which would render own controlled range gate stealer ineffective. If the two radar positions change course or position to produce acceleration, deceleration, or constant closing velocity, the true and false range voltage $V_T$ and $V_F$ will change in accordance therewith to produce the controlled signal $V_F - V_T$ on the time modulator trigger delay signal 38 in proportion to these changes in relative position between radar stations which changes will be exemplified by proportional changes of the falsified echo signal $T_2$ in proportion to the enemy radar transmitted signal $T_o$. One example of this may be given in the illustration in FIG. 3.

Figure 3:
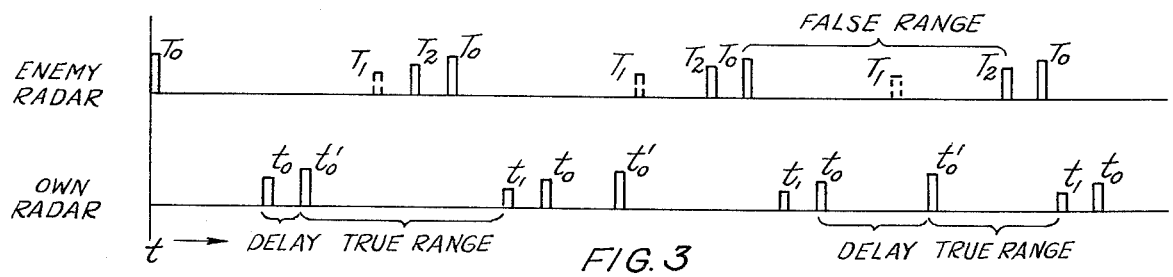
FIG. 3 is a voltage-time graph of own and enemy radar transmitted and received ranging pulses where the radars are closing.

Referring more particularly to FIG. 3 let it be assumed that the two radar positions are closing and the enemy radar transmits ranging signals $T_o$. The relative position of $T_o$ at the enemy radar and the reception of $t_o$ at own radar will become progressively closer in time relationship as the radar ranging pulses are received. This is illustrated in FIG. 3 by denoting that the time relation of $T_o$ to $t_o$ closes as you progress on the graph from left to right. The output of time modulator 24 on the conductor means 23 and compared in the time discriminator 22 with the true ranging intelligence coming by way of conductor 21 produces the false range voltage of $V_F$. $V_F$ is decreasing at a much slower rate than the true range voltage of $V_T$ in this example. $V_F - V_T$ on the output of the subtractor circuit 45 therefore increases in value to cause an increase in delay of the $t_o'$ timing signals with respect to the received $t_o$ signal. This produces an apparent range $T_2$ at the enemy radar that is increasingly greater than the actual range as may be realized from the undetected dotted true range signal $T_1$ at the enemy radar. An operator of the controlled range gate stealer can determine the true range and range rate from the indicator 16 and adjust the potentiometer 25 to a position that will make it appear to the enemy radar that the two radar stations are traveling or positioned at constant velocity thereby concealing the true radar ranging conditions. FIG. 3 illustrates this situation in which the program of the controlled range gate stealer set into the system by potentiometer 25 is transmitting falsified echo signals $t_o'$ with sufficient delay to make the range appear as constant to the enemy tracking radar. As may be seen from this description, adjustment of potentiometer 25 does not thereby produce a fixed delay in the falsified echo signals transmitted by the transmitter repeater 36 but changes this delay in proportion to the acceleration, deceleration, or constant velocity conditions. It is also believed to be clear at this point of the description that the potentiometer 25 is also capable of setting up a program of delays to the falsified echo signal $t_o'$ to make the target $T_2$ at the enemy radar to appear as though the two radar systems were closing on one another or departing from one another; that is, $T_2$ can be made to progressively close on $T_o$ or depart from $T_o$ proportional to the change of $T_1$, the latter being the true range. Since the potentiometer 25 only provides a program of false range and the false tracking loop is co-ordinated with the true range tracking loop to produce a bias on the time modulator trigger delay circuit 38 in accordance with the range position or changes of the enemy radar and own radar positions, the falsified target echo signals $t_o'$ can never be produced to be outside the capabilities of the enemy radar tracking system unless the program established by 25 is excessive in the initial adjustment. That is, the potentiometer 25 has a calibrated range capability to satisfy the tracking capabilities of several enemy radar systems carried by both slow moving and fast moving carrier means, such as propeller aircraft or high speed jet aircraft. Potentiometer 25 may be indexed for all known enemy aircraft so that initial adjustments may be made preceding use. These capabilities of the enemy radar tracking system and its carrying vehicle may be determined from own active radar tracking system from the indicator 16. The time at which the falsified target echo signals may be dropped may be accomplished at any time that is considered appropriate. It is also considered appropriate to "drop the tracker" when the true target position is out of the aperture of the active target tracking loop which is normally equal to the pulse width of the radar transmitted tracking beam. The appropriate time to "drop the tracker" may be accomplished normally or automatically built into the system as is accomplished in conventional countermeasure systems producing fixed delays to the falsified echo signals as fully set forth in the preliminary paragraphs of this description. The synchronizing and blanking circuit 50 is coupled in the usual and known manner of controlling radar receivers for blanking out same a time duration preceding and following transmission of a radar ranging pulse to eliminate extraneous matter normally received in such receivers so that the desired signals are more clearly received and distinguished from normal clutter or grass. In this particular application the receiver repeater 37 should remain on until the transmitter repeater 36 transmits the falsified echo signal at which time receiver 37 is cut off and receiver 10 is turned on. Receiver 10 should remain on until the target echo signal t₁ is received at which time receiver 10 should be turned off and receiver 37 turned on. The system will then operate to receive enemy radar ranging signals which are caught and thrown back with a controlled delay to deceive the enemy radar, these same transmitted falsified radar ranging echo signals being used in the active tracking radar system to produce true range at own radar to thereby gain advantage over the enemy in radar ranging operations during combat, or the like.

While many modifications and changes may be made in the constructional combination to produce a controlled delay gate stealer that will not run outside the tracking capabilities of an enemy radar, in view of the teaching herein set forth without departing from the spirit and scope of this invention, applicant hereby wishes to be limited only by the scope of the appended claims.

I claim:

1. A controlled delay gate stealer for radar ranging countermeasures comprising: an own radar ranging receiver; an own radar repeater transmitter and repeater receiver, said radar repeater receiver being capable of receiving signals from distant radar and of causing said repeater transmitter to transmit same over said repeater transmitter as falsified radar echo signals; a delay circuit coupled between said radar repeater transmitter and said radar repeater receiver, a range control circuit coupled between said radar ranging receiver and said delay circuit, and connected to the coupling between said delay circuit and said repeater receiver, said radar ranging receiver adapted to receive echoes from said falsified radar echo signals for comparison in said range control circuit with said falsified range signals to produce a compared signal to effect a delay in said delay circuit for delaying said falsified echo signals transmitted by said radar repeater transmitter whereby falsified echo signals are transmitted back to the distant radar within the range tracking capabilities of the distant radar and are used for active radar range tracking of said distant radar position.

2. A controlled delay gate stealer as set forth in claim 1 wherein said range control circuit includes a false range tracking loop and a true range tracking loop coupled to said radar ranging receiver and said receiver repeater to receive said distant radar and echo signals to produce false range signals and true range signals, respectively; a range comparison means coupled to compare the true and false range signals to produce a trigger delay voltage; and said trigger delay circuit being coupled to said radar repeater receiver, to said comparison means, and to said radar repeater transmitter for triggering said radar repeater transmitter to transmit said falsified radar echo signals with a delay from said signals of the distant radar in accordance with trigger delay voltage.

3. A controlled delay gate stealer as set forth in claim 2 wherein said false range tracking loop includes means for programming said falsified radar echo signals within the range capabilities of said distant radar by adjustable means to adjustably control said false range signals therefrom.

4. A controlled delay gate stealer as set forth in claim 3 wherein each said tracking loop includes a time modulator for producing a tracking signal coupled to a time discriminator for comparing said tracking signal with the echo of said falsified echo pulse transmitted by said radar repeater transmitter and echoed from said distant radar to produce said true and false range signals, said time modulator in said true range tracking loop being initially triggered by said transmitted falsified echo signals and said time modulator in said false tracking loop being initially triggered by said received distant radar signal.

5. A controlled delay gate stealer for radar ranging countermeasures comprising: an own radar ranging receiver; an own radar repeater transmitter and repeater receiver, said radar repeater receiver being capable of receiving signals from distant range tracking radar and of causing said repeater transmitter to transmit said distant radar signals over said radar repeater transmitter as falsified radar echo signals; and means delaying said transmitted falsified radar echo signals in accordance with a controlled program, said delaying means including a true range tracking loop and a false range tracking loop coupled in parallel between said own radar ranging receiver and a time modulator trigger delay circuit having an output coupled to said radar repeater transmitter to trigger same, each said tracking loop producing a true range voltage signal and a false range voltage signal, respectively, said true range voltage signal being subtracted from said false range voltage signal and the difference applied to said trigger delay time modulator to control the delay time of said transmitter falsified echo signal, said time modulator being activated initially for each transmitted falsified echo signal by each received signal from said distant range tracking radar whereby falsified echo radar pulse signals are transmitted for said distant range tracking radar to deceive same, and true range of said distant radar is produced from own true range tracking loop.

6. A controlled delay gate stealer as set forth in claim 5 wherein said true range tracking loop and said false range tracking loop each has a time modulator for developing a tracking pulse and a time discriminator for producing a voltage signal from a comparison of said tracking pulse and an echo pulse of said transmitted falsified radar echo, said true range tracking loop time modulator developing said true range tracking pulse from said voltage signal of said related time discriminator at a time determined by the application of said trigger delay time modulator trigger, and said false range tracking loop time modulator developing said false range tracking pulse from a program controlled voltage source at a time determined by the application of said received signal from said distant radar.

7. A controlled delay gate stealer for radar ranging countermeasures comprising: an own radar ranging receiver; an own radar repeater transmitter; an own radar repeater receiver; a true range tracking loop and a false range tracking loop, each loop having a time modulator and a time discriminator in circuit therein, each said time discriminator being coupled to produce an output voltage from signal discrimination between echo range signals received by said radar ranging receiver and from the related time modulator, the true range tracking loop time modulator being triggered to produce a voltage signal in accordance with the output voltage and a delayed triggering pulse triggering said own radar repeater transmitter, and the false range tracking loop time modulator being triggered to produce a voltage signal in accordance with an adjustably controlled voltage and a pulse received from a distant radar; a difference circuit coupled to said true and false range tracking loops to subtract said output voltages therefrom providing a difference voltage output; and a trigger delay time modulator coupled to receive said difference voltage and the pulse received from said distant radar to produce said delayed triggering pulse being applied to said radar repeater transmitter for transmitting a falsified echo signal for each pulse received from said radar repeater receiver whereby the range gate tracking of said distant radar is deceived.

8. A controlled delay gate stealer for radar ranging countermeasures in a radar system having a radar transmitter and a radar receiver including a radar range tracking loop producing an output direct current voltage being an analog of range of any reflecting object, the invention which comprises: a false range tracking loop having an adjustable means therein for adjustably controlling the output direct current voltage thereof being an analog of a false range of said reflecting object; a subtractor circuit coupled to receive the output direct current voltages of said tracking loops for producing a direct current voltage difference being the analog of the false range difference from true range of said reflecting object; a trigger delay means coupled to said subtractor circuit and to said transmitter for triggering said transmitter with trigger delay pulses in accordance with the direct current voltage difference; and a repeater receiver for receiving radar pulses from said distant object, the false range tracking loop and said trigger delay means being time referenced from said received radar pulses, and said radar range tracking loop being time referenced from said trigger delay pulses whereby said distant object tracking circuits will be deceived by falsified echo signals and true range is acquired by said radar range tracking loop.

9. A controlled delay gate stealer as set forth in claim 8 wherein said adjustable means is manually adjustable to control direct current voltage applicable, together with said received radar pulses, to a time modulator to produce voltage pulses for discrimination with signals received by said radar receiver in a time discriminator to produce said false tracking loop output direct current voltage.

* * * * *